Patented Dec. 16, 1930

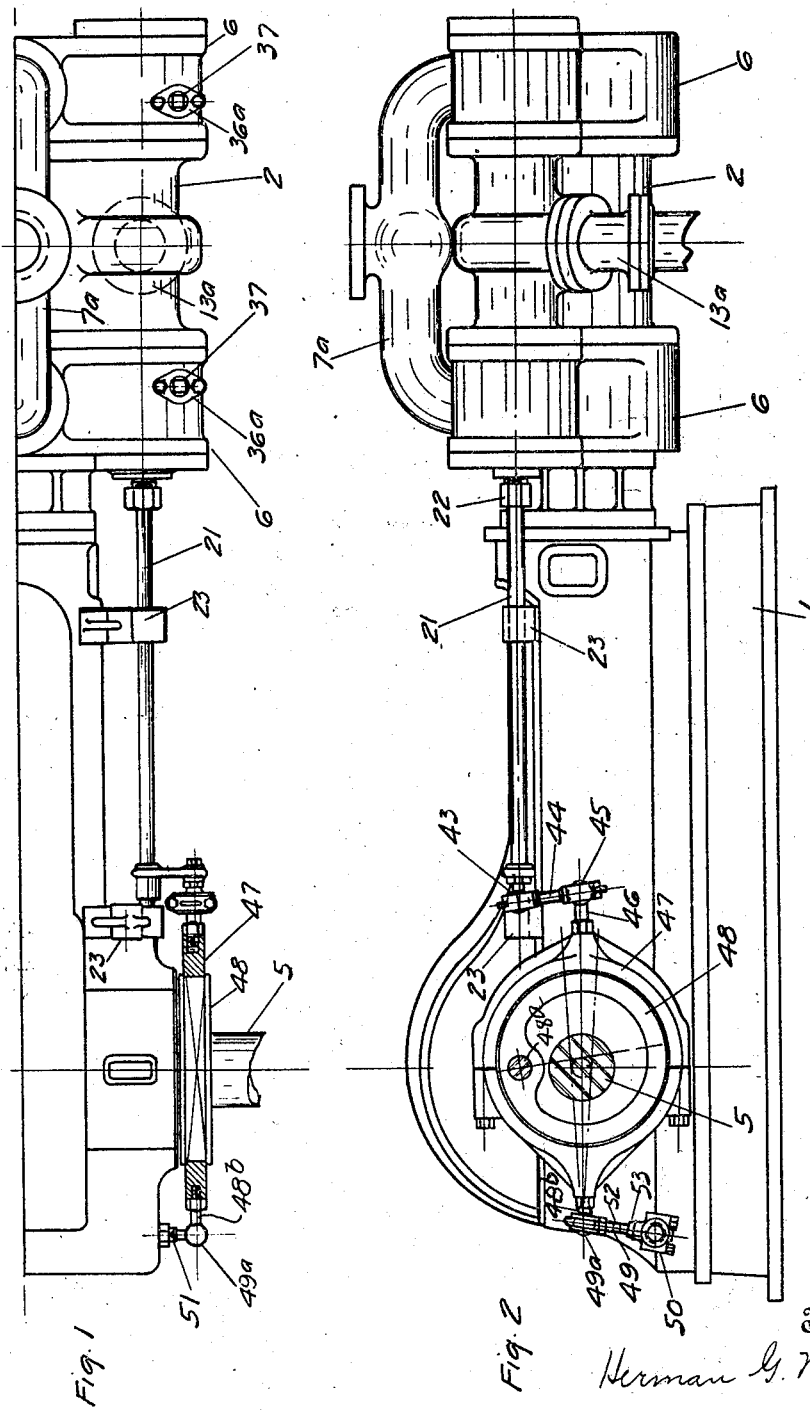

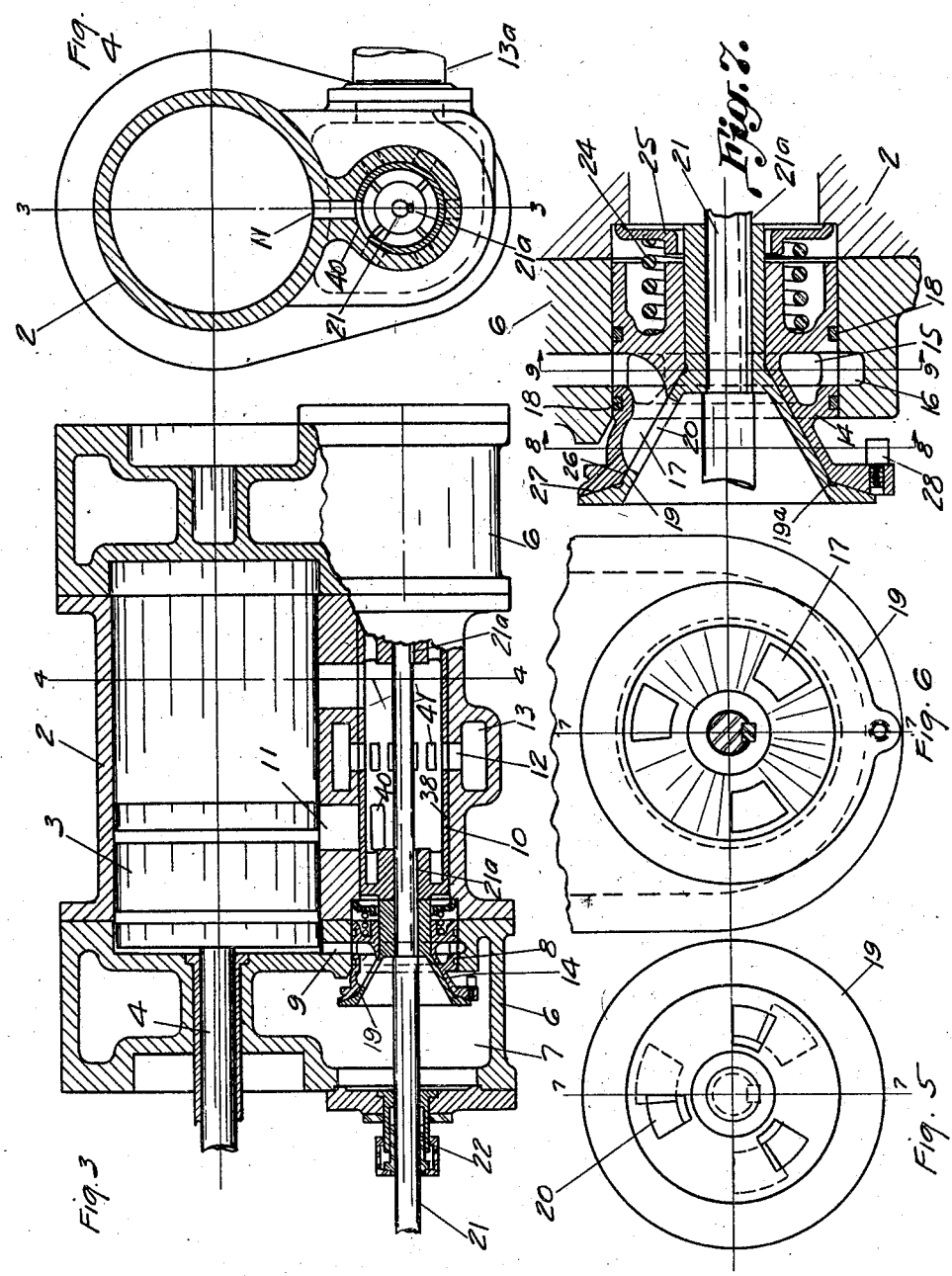

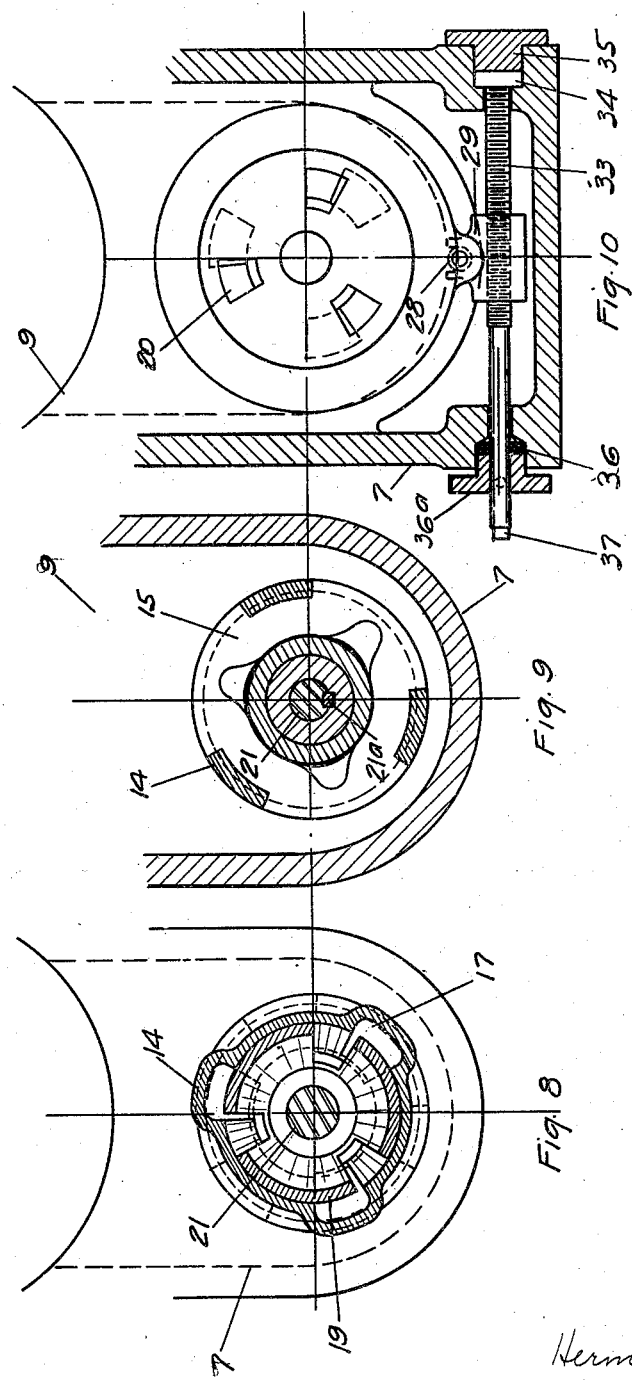

1,785,455

UNITED STATES PATENT OFFICE

HERMAN G. MUELLER, OF ERIE, PENNSYLVANIA, ASSIGNOR TO SKINNER ENGINE COMPANY, OF ERIE, PENNSYLVANIA, A CORPORATION OF PENNSYLVANIA

STEAM ENGINE

Application filed September 7, 1923. Serial No. 661,341.

The invention is designed to simplify valve and valve gears now in use and to obviate many of the difficulties to which steam engine valves and their gears are now subject. In carrying out my invention, I mount valves at opposite ends of the cylinder on seat members and oscillate these valves. The valve seat members on which the valves are operated, are formed perfectly movable so that the wear of the valves may be readily taken up. The valve seat members are all so arranged as to be subjected to comparatively uniform steam temperatures, so that distortion of the seat surfaces is avoided. The exhaust valve is carried by and oscillated by the same shaft as the valves. Invention also contemplates a preferable valve gear for actuating this valve mechanism, as well as other details and features which will appear from the specification and claims.

The invention is illustrated in the accompanying drawings, as follows:—

Fig. 1 shows a plan view of the engine.
Fig. 2 a side elevation of the engine.
Fig. 3 a section of the cylinder and valve on the line 3—3 in Fig. 4.
Fig. 4 a section on the line 4—4 in Fig. 3.
Fig. 5 an end view of one of the valves.
Fig. 6 an end view of one of the valve seat members.
Fig. 7 an enlarged section on the line 7—7 in Figs. 5 and 6.
Fig. 8 a section on the line 8—8 in Fig. 7.
Fig. 9 a section on the line 9—9 in Fig. 7.
Fig. 10 is an end view of the valve and valve seat member, showing the valve seat member adjusting mechanism.

1 marks the engine frame.
2 the engine cylinder.
3 the piston operating in the cylinder, the piston being of elongated uniform type.
4, a piston rod extending from the piston.
5, a crank shaft operated from the piston in the usual manner.

The cylinder heads 6 form the steam chests 7 and steam is delivered to these chests through the pipes 7a. Each chest has a valve seat member socket 8 extending from it and ports 9 lead from the sockets to the end of the cylinder.

An exhaust valve chest 10 is arranged between the sockets 8 and at the side of the cylinder. This chest is connected by ports 11 with the engine cylinder and by ports 12 with an exhaust passage 13, the exhaust passage leading to an exhaust pipe 13a.

The valve seat member 14 has an annular way 15 around it connected with an annular passage 16, which is in the walls of the valve seat member socket and this passage 16 communicates with the port 9. Ways 17 extend through the valve seat member to the way 15, this being symmetrically arranged around the valve member. As shown there are three of the ways 17. Packing rings 18 are arranged in the valve seat member at each side of the passage 16 and port 9 and thus form closures against leakage from these ports by way of the valve seat member. Valve 19 seats on the valve seat member and is of a generally tapered or conical form. It is provided with ways 20 which operate in conjunction with ways 17 as the valve is oscillated to open and close the valves. The valve is fixed on an oscillating shaft 21 which extends into the valve chest and has its axis parallel with the axis of the cylinder. The shaft extends through the gland 22 and is mounted in boxes 23 on the engine frame.

The valve seat member is movable endwise in its socket and a spring 24 is coiled around the inner end of the valve seat member and rests against a plate 25 at the end of the exhaust chest. This spring yieldingly holds the valve seat member in seating contact with the valve and takes up whatever wear there may be in the valve. The valve may be made as nearly balanced as desired by making the socket 8 larger or smaller relatively to the outer diameter of the valve and valve seat member. As shown this socket is nearly as large as the larger portion of the valve seat member and consequently the excess area of the valve seat member being slight, the pressure of the valve due to steam is quite small. It will be understood that this should be sufficient to at least balance the pressure on the valve seat member as exerted through the ways 20 when the valve is closed.

The valve seat member and valve have two distinct tapers 26 and 27. These surfaces approximate in contour a bearing surface corresponding to a mathematical surface of revolution, developed by a curve known as a tractrix, which considering the surface, its movement and thrust gives a uniform wearing friction.

In order to adjust the timing of the valve, I have provided the following mechanism.

The pin 28 is secured in the valve seat member and is engaged by a yoke 29 (see Fig. 10). Screw 33 extends through the yoke and has a head 34 which is secured in a socket by cap 35. The screw has a stem which extends through a gland 36a of a packing 36 and is provided with a square end 37 by means of which the screw may be operated. It can readily be seen that by turning the screw, the valve seat member may be adjusted to give the proper timing and the valve at each end of the cylinder may be operated independently and while the engine is in motion. The valve may be lubricated by any lubricating system not shown, preferably delivering oil to a small groove 19a between the valve and the valve seat member. It will be observed that the valve seat member as well as the valve project into the steam chest so that the walls are exposed entirely around the valve to uniform steam temperature, and thus distortion, due to temperature variations, is very largely avoided. Exhaust valve 38 is cylindrically shaped and keyed on the shaft 21 utilizing the same keys 21a as is used for locking the valves. The exhaust valve is provided with the ways 40 which operate over the ports 11 and are properly positioned to time the exhaust as desired. A series of ways 41 communicate with the exhaust passages or ports 12, leading to the exhaust passage 13. The exhaust valve as will be observed, is thus oscillated in unison with the steam valve and by the same mechanism.

A rock arm 42 is fixed on the shaft 21 near the crank shaft end and is provided with a ball 43 forming a ball joint with a link 44. The link 44 operates with the ball 45 on arm 46. The arm 46 extends from an eccentric strap 47 arranged on the eccentric 48 hung on a pin 48a controlled by a governor (not shown). A pin 48b extends from the eccentric strap at the side opposite the pin 46 and terminates in a ball 49a. A link 49 extends from the ball 49a to a ball 50 mounted on a post or stud 51 secure to the frame. The central rod 52 of the link may be adjustable if desired and locked in adjustment by jam nuts 53.

What I claim as new is:—

1. In a steam engine, the combination of a cylinder having steam ports at its ends; valve seats, said seats having cylindrical extensions through which said ports extend; packing rings on the extensions at each side of the ports; a rotatable shaft parallel to the axis of the cylinder and opposed tapered rotatable valves on the shaft operating on the said seats.

2. In a steam engine, the combination of a cylinder having a steam port leading thereto; a valve seat having a cylindrical extension through which said port extends; packing rings on the extension on each side of the port; a tapered valve operating on said seat; and means for oscillating the valve.

3. In a steam engine, the combination of a cylinder having inlet steam ports; valve seat members through which the ports extend; a rotatable lay shaft parallel to the axis of the cylinder; opposed inlet valves on the shaft controlling said ports and an exhaust valve carried by the shaft between the inlet valves.

4. In a steam engine, the combination of a cylinder having ports leading to its ends; steam chests at the ends of the cylinder; inlet valve seat members through which the ports extend, said members having free ends projecting into the steam chest in position to be surrounded by steam in the chest and rotatable valves operating on said members, said valves and members having their axes parallel to the axis of the cylinder.

5. In a steam engine, the combination of a cylinder having ports leading to its ends; steam chests at the ends of the cylinder; inlet valve seat members through which the ports extend, said members having free ends projecting into the steam chests in position to be surrounded by steam in the chests and tapered rotatable valves operating on said members, said valves and members having their axes parallel to the axis of the cylinder.

6. In a steam engine, the combination of a cylinder having ports leading to its ends; an oscillating shaft parallel to the axis of the cylinder; normally stationary inlet valve seat members concentric with the shaft and through which the ports extend; valves on the shaft seating on said valve seat members independently and means for rotating the members to time the valves.

7. In a steam engine, the combination of a cylinder; a normally stationary valve seat member having a cylindrical extension with a port leading to the cylinder; closure rings at each side of the port; a rotatable valve operating on said seat and means for rotating the seat member to time the valve.

8. In a steam engine, the combination of a cylinder; a normally stationary valve seat member having a cylindrical extension with a port leading to the cylinder; closure rings at each side of the port; a valve operating on said seat and means for rotating the seat member to time the valve comprising a screw having an exposed stem permitting the adjusting during the operation of the engine.

9. In a steam engine, the combination of a cylinder having a steam chest with a port leading to the cylinder the port leading from a cylindrical socket extending from the chest; a valve seat member having a cylindrical extension arranged in the socket with ways leading to the port, the valve seat member being movable axially; a rotatable valve operating on the member, said member having a diameter proportioned to the diameter of the extension to approximately balance the rotatable valve.

10. In a steam engine, the combination of a cylinder having a port leading thereto; a steam chest having a socket extension; the valve seat member having a cylindrical extension in the socket; a rotatable valve operating on the valve seat member; a spring operating on the valve seat member and yieldingly forcing the same into contact with the valve.

In testimony whereof, I have hereunto set my hand.

HERMAN G. MUELLER.